US006810038B1

United States Patent
Isoyama et al.

(10) Patent No.: US 6,810,038 B1
(45) Date of Patent: *Oct. 26, 2004

(54) SWITCH, SCHEDULER THEREOF, AND SWITCH SCHEDULING METHOD

(75) Inventors: Kazuhiko Isoyama, Tokyo (JP); Masahiko Honda, Tokyo (JP)

(73) Assignee: NEC Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/538,476

(22) Filed: Mar. 30, 2000

(30) Foreign Application Priority Data

Apr. 2, 1999 (JP) .......................................... 11-097011

(51) Int. Cl.[7] .......................... H04L 12/28; G01R 31/08
(52) U.S. Cl. .................. 370/395.42; 370/235; 370/413; 370/389
(58) Field of Search ................................ 370/389, 392, 370/395.21, 395.4, 395.42, 395.43, 412, 413, 414, 417, 447, 462, 235

(56) References Cited

U.S. PATENT DOCUMENTS 5,694,121 A * 12/1997 Krause et al. ........... 340/825.5
5,923,656 A * 7/1999 Duan et al. ............... 370/395.4
6,160,812 A * 12/2000 Bauman et al. ............. 370/416
6,185,221 B1 * 2/2001 Aybay ........................ 370/412
6,424,655 B1 * 7/2002 Horst ........................ 370/412

FOREIGN PATENT DOCUMENTS

JP          8-56230          2/1996
JP         10-200550         7/1998

* cited by examiner

Primary Examiner—Hassan Kizou
Assistant Examiner—Hanh Nguyen
(74) Attorney, Agent, or Firm—Sughrue Mion, PLLC

(57) ABSTRACT

A switch is provided that implements flexible switch scheduling according to priority levels set in data, by means of a simple apparatus configuration. A scheduler provided in the switch includes a request distribution block that distributes transfer data connection requests according to the priority level of the transfer data, a first allocator that performs allocation for high-priority-level transfer data connection requests from among the distributed connection requests, a second allocator that performs allocation for low-priority-level transfer data connection requests, an allocation combination block that combines the results of allocation by the first and second allocators, and a grant generator that sets a switch execution block on the basis of the combined allocation result, and outputs Grant signals; and further includes a request mask block that masks connection requests that duplicate the result of allocation by the first allocator before allocation is executed by the second allocator.

12 Claims, 14 Drawing Sheets

SWITCH, SCHEDULER THEREOF, AND SWITCH SCHEDULING METHOD

BACKGROUND OF THE INVENTION

1. Field of the Invention

The present invention relates to a network switch such as a router or switch, etc., that performs data transfer in a network (in the following description, these apparatuses are referred to by the generic term "switch"), and more particularly relates to a switch that performs switch scheduling in accordance with priority levels set in the data, together with the associated scheduler and switch scheduling method.

2. Description of the Prior Art

Previously, data traffic on the Internet has been characterized as of "best effort" type, and traffic Quality of Service (QoS) has not been implemented with respect to zones, delays, fluctuation s, etc. When a switch that transfers IP packets received a packet, it has only performed packet transfer with the QoS available at the time the packet was received, and QoS has not been assured.

However, the emergence of protocols such as RSVP (Reservation Protocol) and DiffServ (Differentiated Service) has made it possible for traffic QoS to be assured as a protocol, even on the Internet.

With switches, also, technology has been proposed for implementing QoS assurance with traffic classified by QoS. An example of this kind of prior art is the switch shown in Japanese Patent Laid-Open No. 10-200550.

Meanwhile, functions provided by VoIP (Voice over IP), etc., have made it possible to accommodate telephonic speech on the Internet, and there have been moves by telephone companies to implement telephone networks by means of the Internet. As a result, QoS assurance requirements for the Internet have become even more stringent in recent years.

FIG. 14 shows the configuration of a conventional switch, and FIG. 15 shows the switching operation by the switch in FIG. 14 in its flowchart. With reference now to FIG. 14, the switch comprises a plurality of input ports 110a to 110b that input data, a plurality of output ports 140a to 140b that output data, a switching execution block 130 that switches data input from the input ports 110a to 110b and transmits it to the output ports 140a to 140b, and a scheduler 120 that controls switching by the switching execution block 130. The input ports 110a to 110b each comprise queues 111 provided for each output port.

With reference now to the flowchart in FIG. 15, first, when an input port 110a to 110b receives data destined for one of the output ports 140a to 140b, that data is queued in a per-output-port queue 111 (step 1501). Next, in order to request switch 130 connection, the input port 110a to 110b sends the scheduler 120 a request for connection to the desired output port (step 1502).

When the scheduler 120 accepts connection requests from input ports 110a to 110b, it performs connection destination allocation in such a way as to avoid mutual collision between connections from individual input ports 110a to 110b to output ports 140a to 140b (step 1503). Then, it sets the switch 130 according to the allocation (step 1504), and returns Grant signals to the input ports 110a to 110b indicating the respective connection destination output ports 140a to 140b (step 1505).

The individual input port 110a to 10b transmits to the switch 130 the data destined for the connection destination output port reported by the Grant signal (step 1506). Then, the switch 130 performs switching in accordance with the setting by the scheduler 120, and transmits the accepted data to the individual output port 140a to 140b (step 1507).

However, in switch scheduling by means of the prior art described above, uniform scheduling is performed that takes no account of the quality, priority, etc., of the data being switched. Consequently, when performing transfer via the Internet of traffic, such as telephonic speech, with stringent requirements in terms of delay characteristics, or when traffic using a number of protocols with differing quality and characteristics is handled by a single switch, it is not possible to achieve switching in accordance with traffic quality.

In Japanese Patent Laid-Open No. 8-56230, a switching system is shown that implements switch scheduling according to priority. In the switching system shown in this Patent Publication, traffic of all priorities is simultaneously scheduled by a single scheduler. That is to say, as shown in FIG. 16, the scheduler 1610 has, for each cell entry, a tag register 1620 that has tags showing cell priority, and a comparator 1630 that compares the values of the priorities held in the tag register 1620, and performs scheduling by comparing the cell priorities sequentially, one by one. Therefore, the scheduler 1610 must perform the task of scheduling by judging all priorities within one cell time interval (one time slot). Moreover, a special scheduling algorithm must be provided in order to satisfy this condition.

BRIEF SUMMARY OF THE INVENTION

OBJECT OF THE INVENTION

Since, in conventional switch scheduling, uniform scheduling is performed that takes no account of the quality, priority, etc., of the data being switched, as described above, a defect of conventional switch scheduling is that it may not be possible to implement switching in accordance with traffic quality.

Moreover, a shortcoming of the switching system described in Japanese Patent Laid-Open No. 8-56230 is that the configuration of the apparatus is made complex by the need to perform the task of scheduling by judging all priorities within one cell time interval (one time slot). A further shortcoming of this switching system is that flexible setting changes cannot be made because of the need for a special scheduling algorithm.

The present invention has as an objective the provision of a switch, and its associated scheduler and switch scheduling method, that solve the above mentioned defects in the conventional system, and implement flexible switch scheduling in accordance with priority levels set in the data, by means of a simple apparatus configuration.

Further, the present invention has as an objective the provision of a switch, and its associated scheduler and switch scheduling method, that can easily be introduced into a network system by implementing switch scheduling that includes priority control using, without modification, the conventional means of switch scheduling (algorithm, etc.) that does not include priority control.

SUMMARY OF THE INVENTION

An aspect of the present invention that attains the above mentioned object comprises a plurality of input ports that input transfer data and a plurality of output ports that output transfer data; means for executing switching that switches transfer data that is input from said input ports and transmits it to said output ports; and a scheduler that controls switching by said means for executing switching in response to connection requests for said transfer data from said input ports; wherein said scheduler, in a switch that is provided in a network and performs IP packet transfer, comprises distribution means that inputs said transfer data from said input ports and distributes connection requests for said transfer data in accordance with priority levels set in said transfer data that is input; first means for switch connection allocation that performs switch connection allocation corresponding to connection requests for said transfer data with a high priority level from among the connection requests distributed by said distribution means; second means for switch connection allocation that performs switch connection allocation corresponding to connection requests for said transfer data with a low priority level from among the connection requests distributed by said distribution means; combination means that combines the results of switch connection allocation by said first means for switch connection allocation and said second means for switch connection allocation; and means for permitting switch connection that, on the basis of the result of switch connection allocation combined by said combination means, sets said means for executing switching and performs notification that permits switch connection for said input ports; wherein said second means for switch connection allocation comprises masking means for masking, prior to execution of switch connection allocation processing, said connection requests that duplicate the result of switch connection allocation by said first means for switch connection allocation.

In another aspect, the present invention further comprises third means for switch connection allocation that performs switch connection allocation corresponding to connection requests for said transfer data with a lower priority level than said transfer data corresponding to said second means for switch connection allocation; and second combination means that combines the result of switch connection allocation combined by said combination means and the result of switch connection allocation by said third means for switch connection allocation; wherein said third means for switch connection allocation comprises masking means for masking, prior to execution of switch connection allocation processing, said connection requests that duplicate the result of switch connection allocation combined by said combination means.

In still another aspect, the present invention comprises in stages said third means for switch connection allocation and said second combination means, in accordance with the number of said connection requests distributed by said distribution means.

In still another aspect, the present invention further comprises means of selection, provided between said combination means and said means for permitting switch connection, whereby the result of switch connection allocation by said first means for switch connection allocation and the result of switch connection allocation combined by said combination means are input, and one or other of said switch connection allocation results is output selectively and sent to said means for permitting switch connection; wherein said means for permitting switch connection, on the basis of the result of combined switch connection allocation output from said selection means, sets said means for executing switching and performs notification that permits switch connection for said input ports.

Moreover, another aspect of the present invention that attains the above mentioned object comprises a plurality of input ports that input transfer data and a plurality of output ports that output transfer data; means for executing switching that switches transfer data that is input from said input ports and transmits it to said output ports; and a scheduler that controls switching by said means for executing switching in response to connection requests for said transfer data from said input ports; wherein the switch scheduling method in a switch that is provided in a network and performs IP packet transfer comprises the step of inputting said transfer data from said input ports and distributing connection requests for said transfer data in accordance with priority levels set in said transfer data that is input; the step of performing switch connection allocation corresponding to connection requests for said transfer data with a high priority level from among the connection requests distributed by said distribution step; the step of performing switch connection allocation corresponding to connection requests for said transfer data with a low priority level from among the connection requests distributed by said distribution means; the step of combining the results of switch connection allocation by said two switch connection allocation steps; and the step of setting said means for executing switching and performing notification that permits switch connection for said input ports, on the basis of the result of switch connection allocation combined by said combination step; wherein said step of allocating switch connection corresponding to connection requests for said transfer data with a low priority level includes the step of masking, prior to execution of switch connection allocation processing, said connection requests that duplicate the result of switch connection allocation by said first switch connection allocation means.

In still another aspect, said step of switch connection allocation corresponding to connection requests for said transfer data with a low priority level, and said combination step, are repeated in stages, in accordance with the number of said connection requests distributed by said distribution means.

In still another aspect, the present invention further comprises the step, provided between said combination step and said permitting switch connection step, of inputting the result of switch connection allocation by the step of switch connection allocation corresponding to said connection requests for said transfer data with a high priority level, and the result of switch connection allocation combined in said combination step, and outputting selectively one or other of said switch connection allocation results; wherein said means for executing switching is set, and notification is performed that permits switch connection for said input ports, on the basis of the result of switch connection allocation selected in said selection step, in said permitting switch connection step.

In still another aspect, said step of switching connection allocation corresponding to data transfer connection requests is executed in parallel by means of pipeline processing for each priority level.

BRIEF DESCRIPTION OF THE DRAWINGS

This above mentioned and other objects, features and advantages of this invention will become more apparent by reference to the following detailed description of the invention taken in conjunction with the accompanying drawings, wherein.

DETAILED DESCRIPTION OF THE PREFERRED EMBODIMENTS

With reference now to the attached drawings, the embodiments of the present invention will be explained in detail below.

Figure 1:
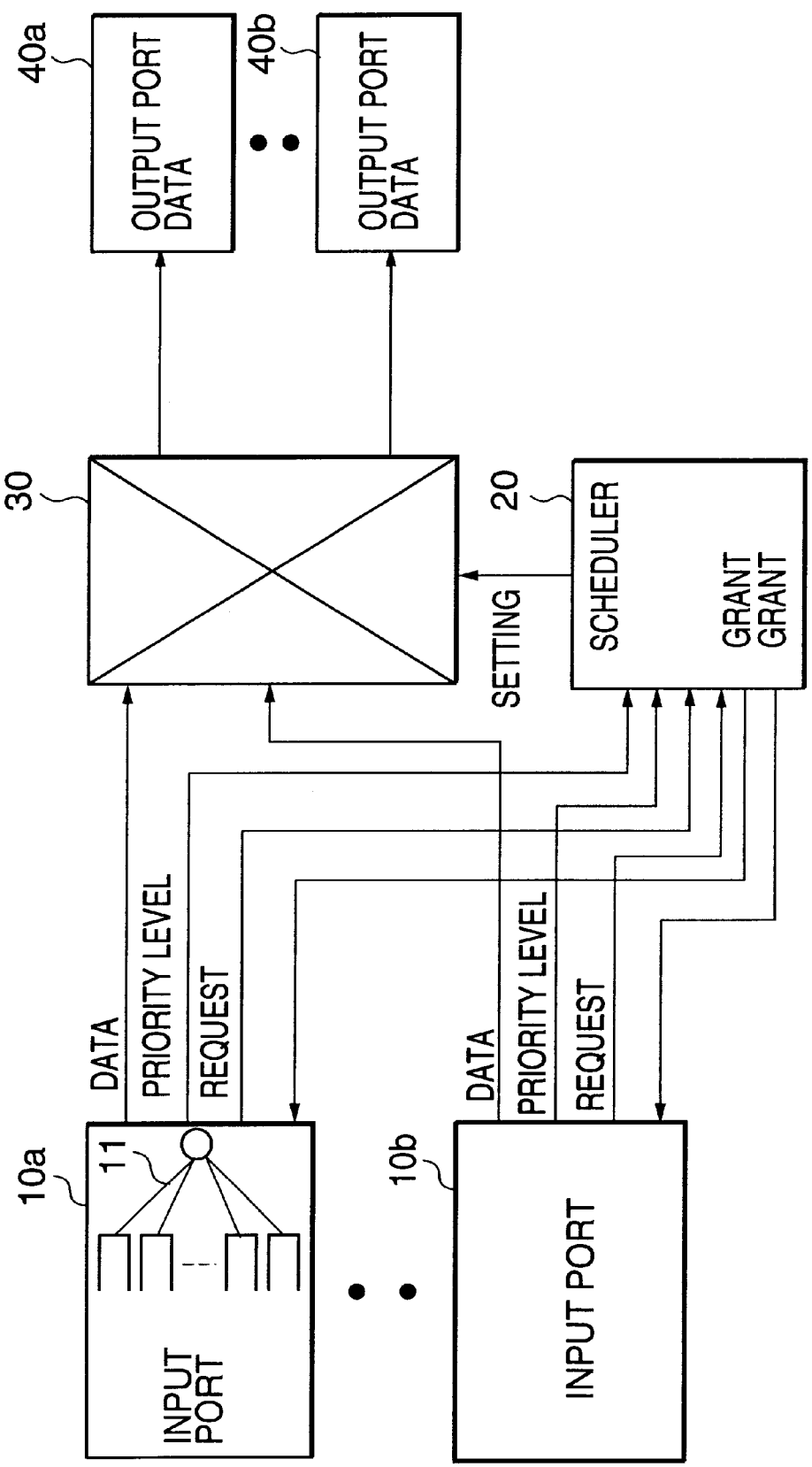
FIG. 1 is a block diagram showing the configuration of the switch in Embodiment 1 of the present invention.

FIG. 1 is a block diagram showing the switch configuration according to Embodiment 1 of the present invention. With reference now to FIG. 1, the switch of the present embodiment comprises a plurality of input ports 10a to 10b that input data, a plurality of output ports 40a to 40b that output data, a switching execution block 30 that switches data input from the input ports 10a to 10b and transmits it to the output ports 40a to 40b, and a scheduler 20 that controls switching by the switching execution block 30. The input ports 10a to 10b each comprise queues 11 provided for each output port.

In FIG. 1, when an input port 10a to 10b receives transfer data (cell or switch) destined for one of the output ports 40a to 40b, that transfer data is queued in a queue 11 provided for each output port 40a to 40b. Then, the scheduler 20 is notified of the switch priority level (referred to below simply as priority level) set in that transfer data and the destination output port, and a connection request is made. The scheduler 20 performs scheduling with priority levels added according to the received connection requests, performs switch setting for the switching execution block 30 on the basis of the scheduling result, and returns the scheduling results (Grant signals) to the input ports 10a to 10b. An input port 10a to 10b that receives the scheduling result transfers the transfer data to the switching execution block 30 on the basis of the scheduling result. The switching execution block 30 transfers the transfer data to an output port 40a to 40b on the basis of the switch setting by the scheduler 20.

The operation whereby an input port 10a to 10b attaches a priority level to the transfer data is explained below. Before queuing the received transfer data in a queue 11, the input port 10a to 10b references the header of the transfer data, determines the priority level, and adds it to the transfer data as an internal header. FIG. 6 to FIG. 9 show sample transfer data formats. If the transfer data protocol is TCP/IP, the input port 10a to 10b references the port number, etc., that indicates the service type field of the IPv4 (Version 4) header shown in FIG. 6, the priority level field of the IPv6 (Version 6) header shown in FIG. 7, the host protocol of the TCP header shown in FIG. 8, etc., and determines the priority level. In case of an ATM cell, the input port 10a to 10b references the CLP (Cell Loss Priority), etc., and determines the priority level. When attaching a priority level to transfer data, the input port 10a to 10b, in the same way as a basic switch, detects the destination address of the transfer data and determines the output port, and adds that information also as an internal header.

Figure 2:
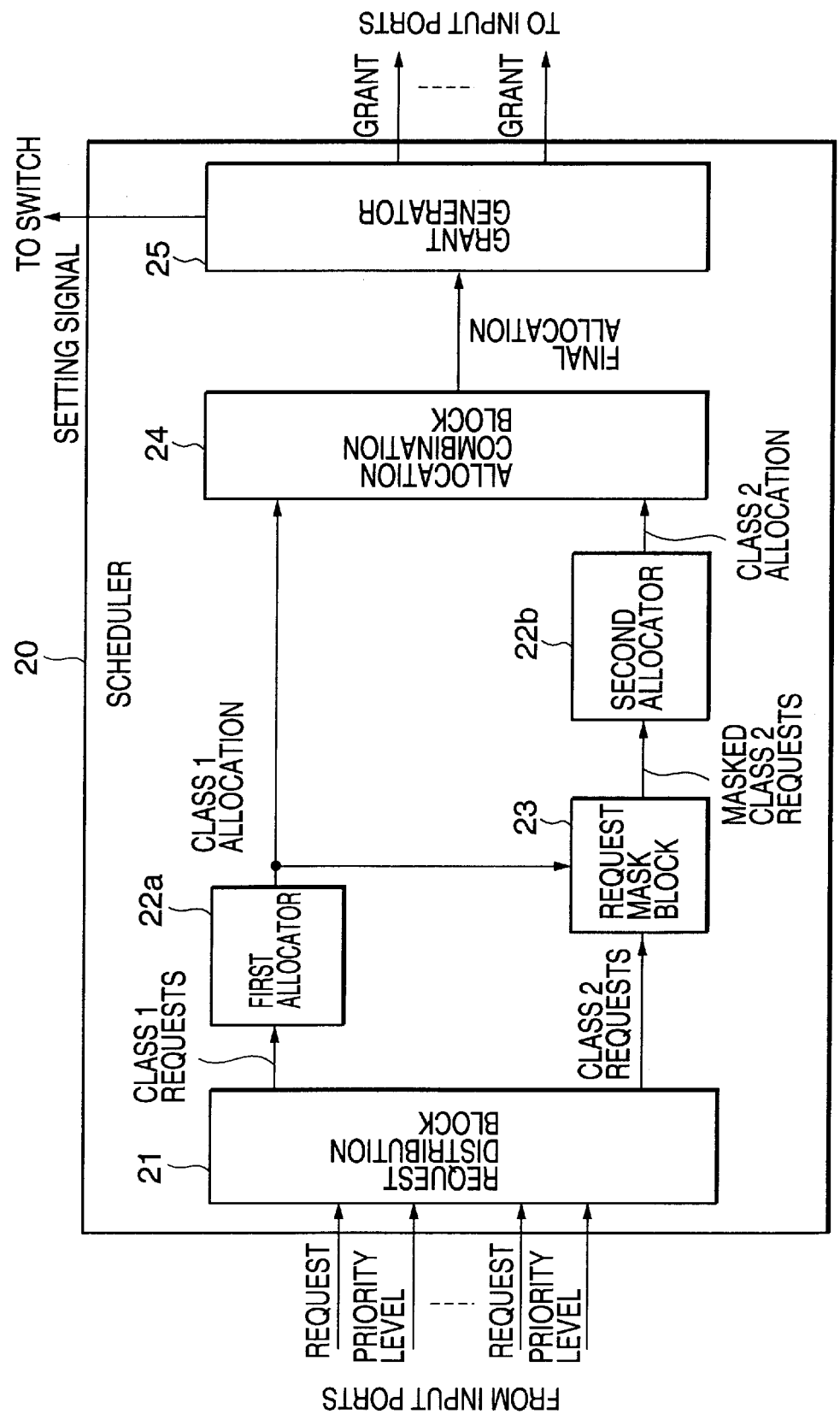
FIG. 2 is a block diagram showing the configuration of the scheduler in Embodiment 1.

FIG. 2 is a block diagram showing the configuration of the scheduler 20 in the switch of the present embodiment configured as described above. With reference now to FIG. 2, the scheduler 20 comprises a request distribution block 21 that performs transfer data distribution according to priority level, a first allocator 22a that performs allocation of high-priority-level transfer data, a request mask block 23 that masks connection requests on the basis of the result of allocation by the first allocator 22a, a second allocator 22b that performs allocation of low-priority-level transfer data after processing by the request mask block 23, an allocation combination block 24 that combines the results of allocation by the first allocator 22a and the second allocator 22b, and a grant generator 25 that generates Grant signals indicating the scheduling result according to the final combined allocation result produced by the allocation combination block 24. FIG. 2 shows only the configuration characteristic of the present embodiment, and omits other general configuration items.

In the scheduler 20 configured as described above, the request distribution block 21 distributes connection requests by data priority level on the basis of priority level notifications received from input ports 10a to 10b accompanying connection requests requesting connection to the switch 30. The request distribution block 21 is implemented by means of a selector circuit, for example. In the present embodiment, there are two priority levels, Priority and Non-Priority, with Priority connection requests designated as Class 1 requests, and Non-Priority connection requests designated as Class 2 requests. Class 1 requests are sent to the first allocator 22a, and Class 2 requests to the second allocator 22b.

The first allocator 22a accepts Class 1 requests from the request distribution block 21, and of these Class 1 requests, selects connection requests for which neither the input port nor the output port is duplicated, and performs switch connection allocation. An ordinary algorithm used by the scheduler of a conventional switch can be used as the algorithm for allocation by the first allocator 22a.

The request mask block 23 accepts Class 2 requests from the request distribution block 21, accepts the result of allocation from the first allocator 22a, and of these Class 2 requests, masks requests for which there is duplication by either or both a Class 1 request from the first allocator 22a or/and an input port or output port. The request mask block 23 is implemented by means of an exclusive-OR circuit, for example.

The second allocator 22b performs switch connection allocation for Class 2 requests masked by the request mask block 23. As in the case of the first allocator 22a, an ordinary algorithm used by the scheduler of a conventional switch can be used as the algorithm for allocation by the second allocator 22b.

The allocation combination block 24 combines the result of allocation for Class 1 requests by the first allocator 22a and the result of allocation for Class 2 requests by the second allocator 22b, and generates the final allocation. The allocation combination block 24 is implemented by means of an OR circuit, for example.

Based on the final allocation generated by the allocation combination block 24, the grant generator 25 outputs a setting signal that sets the switch 30, and transmits Grant signals to input ports 10a to 10b to give notification of switch connection permission.

Figure 3:
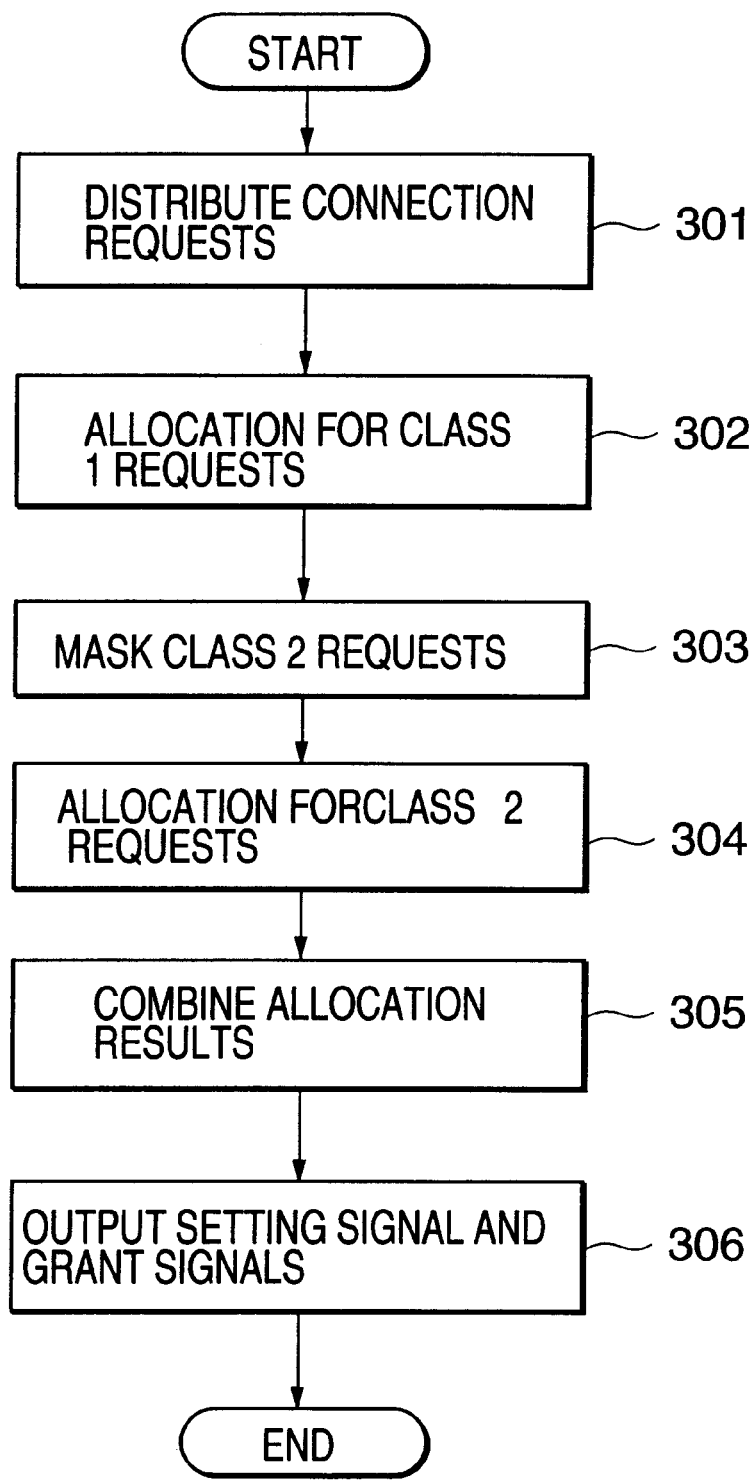
FIG. 3 is a flowchart showing the operation of the scheduler in Embodiment 1.
Figure 4:
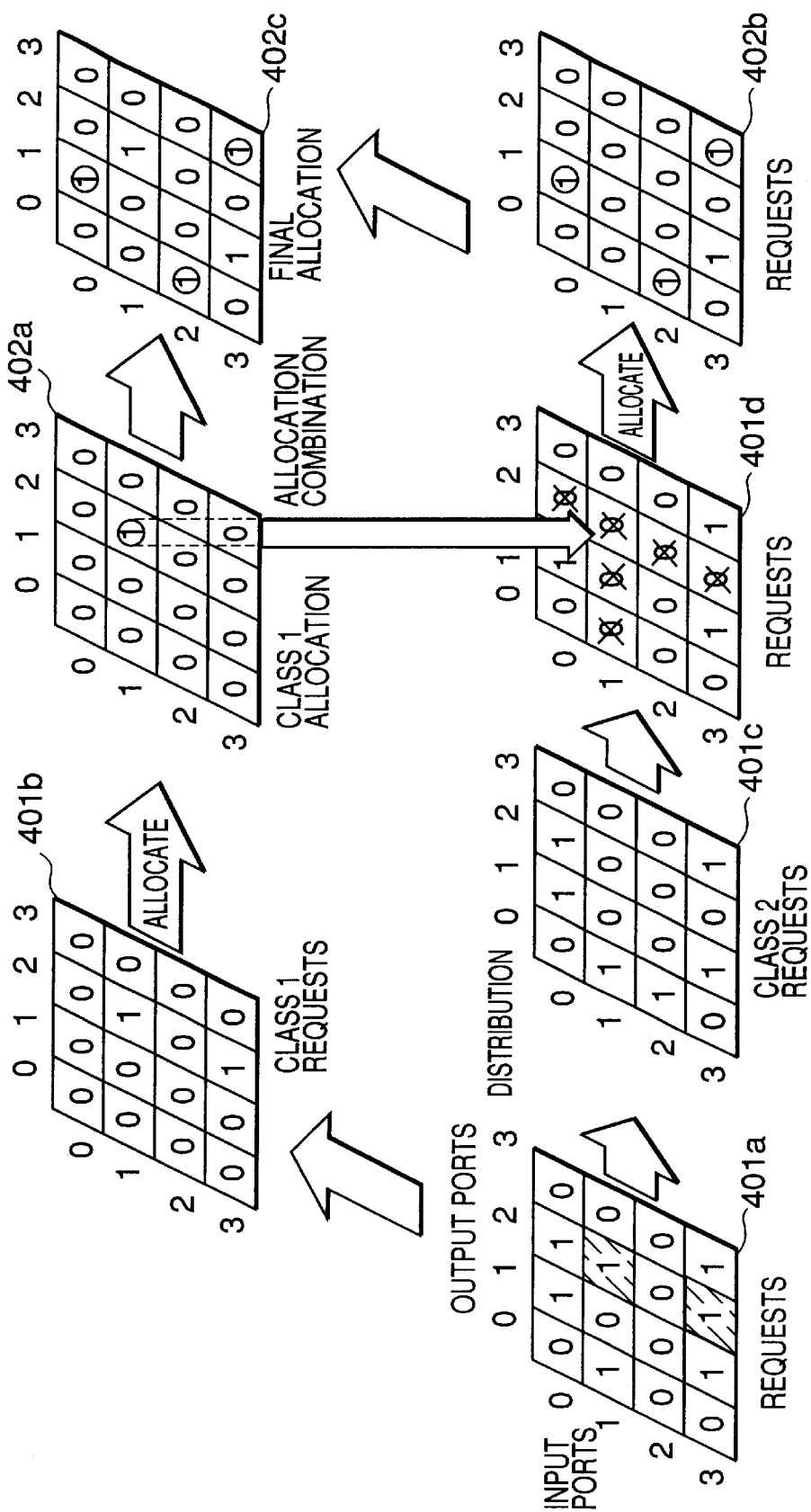
FIG. 4 is a drawing showing an example of switch scheduling execution by the scheduler in Embodiment 1, in which connection requests and allocation results are represented by matrices with input ports and output ports as their axes.

Next, the operation of the scheduler 20 in the present embodiment is described with reference to the flowchart in FIG. 3, and to FIG. 4. FIG. 4 is a drawing showing connection requests and allocation results in the form of a matrix with input ports and output ports as its axes. In the example shown here, there are four input ports and four output ports. In the matrix shown in FIG. 4, if the value at the intersection of any input port and output port is "1," this means that there is a request for connection from that input port to that output port. Also, the connection requests indicated by crosshatching (the connection request from input port "1" to output port "2" and the connection request from input port "3" to output port "2") are high-priority-level Class 1 requests, while the other connection requests (the connection requests from input port "0" to output port "1," from input port "0" to output port "2, "from input port "1" to output port "0," from input port "2" to output port "0," from input port "3" to output port "1," and from input port "3" to output port "3") are low-priority-level Class 2 requests.

First, the matrix 401a in FIG. 4 that shows the connection requests input to the scheduler 20 is distributed as Class 1 requests (matrix 401b) and Class 2 requests (matrix 401c) by the request distribution block 21 (step 301).

Next, allocation is performed for the Class 1 requests of matrix 401b by the first allocator 22a (step 302). As both Class 1 requests are requests for connection to output port "2," only one of the Class 1 requests is allocated a switch connection. The result of this allocation is matrix 402a. According to matrix 402a, the Class 1 request from input port "1" to output port "2" is allocated a switch connection. As stated above, an ordinary algorithm as used in conventional switches can be used as the allocation algorithm.

Next, the matrix 401c that shows Class 2 requests is masked by the request mask block 23 (step 303). Referring to the matrix 401d showing masked Class 2 requests, Class 2 requests for which the input port is "1" and Class 2 requests for which the output port is "2" are masked with respect to the Class 1 request allocated a switch connection in matrix 402a.

Next, allocation is performed for the Class 2 requests of matrix 401d by the second allocator 22b (step 304). The result of this allocation is matrix 402b. According to matrix 402b, the Class 2 request from input port "0" to output port "1, "the Class 2 request from input port "2" to output port "0," and the Class 2 request from input port "3" to output port "3" are allocated a switch connection. As stated above, an ordinary algorithm as used in conventional switches can be used as the allocation algorithm.

Next, the matrix 402a allocation result and the matrix 402b allocation result are combined by the allocation combination block 24 (step 305). The combined allocation result is matrix 402c.

Finally, a setting signal that sets the switch 30 and Grant signals that notify the input ports 10a to 10b of connection permission are output by the grant generator 25 in accordance with the allocation result shown in matrix 402c (step 306).

As described above, in the present embodiment, the first allocator 22a first performs allocation for high-priority-level Class 1 requests, the request mask block 23 uses that result to mask low-priority-level connection requests, and then the second allocator 22b performs allocation for low-priority-level Class 2 requests for which that masking was executed. Thus, even if switch scheduling is performed for connection requests of different priority levels, there will be no duplication of allocation between high-priority-level connection requests and low-priority-level connection requests.

Also, since combination of connection request allocations can be performed by a selector and OR circuit, and it is not necessary to consider connection request priority levels during allocation by the allocators, a simple apparatus configuration can be used for the scheduler.

Moreover, as there is no need to provide a special allocation algorithm for the allocation performed by the allocators, and an ordinary allocation algorithm as used in conventional switches can be used, introduction of the system is easy, and flexible scheduling can be performed.

Figure 5:
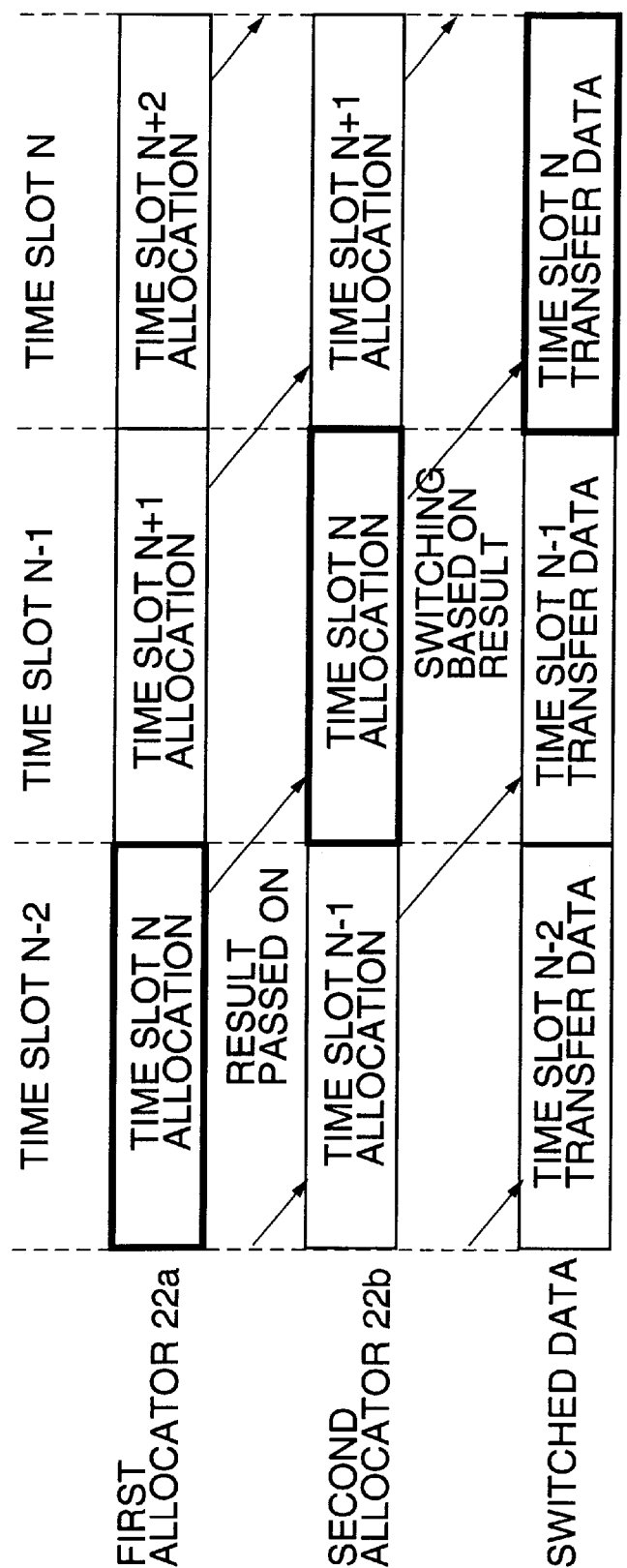
FIG. 5 is a time chart showing how switching operations are carried out by pipeline processing in Embodiment 1.
Figure 6:
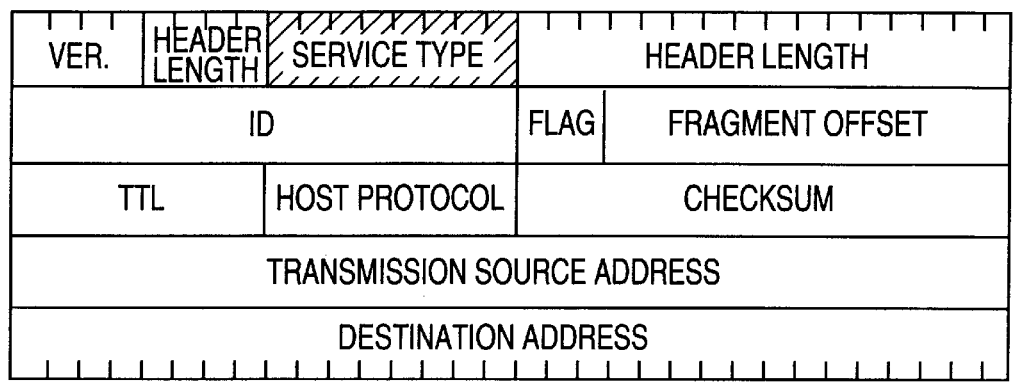
FIG. 6 is a drawing showing the IPv4 (Version 4) header format in TCP/IP.
Figure 7:
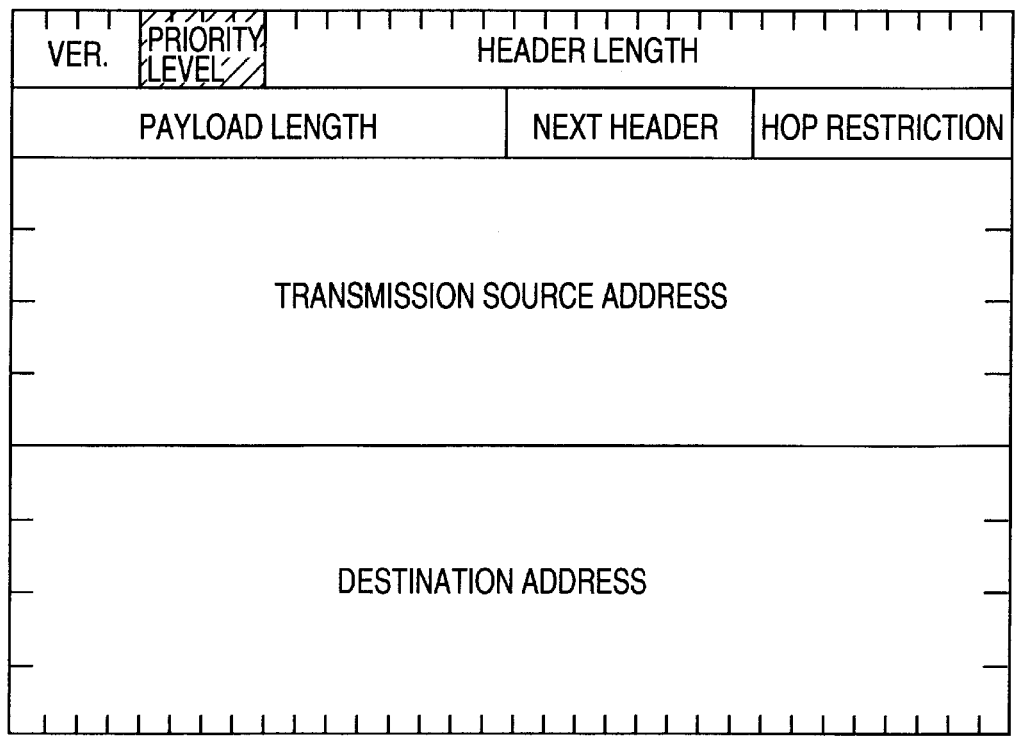
FIG. 7 is a drawing showing the IPv6 (Version 6) header format in TCP/IP.
Figure 8:
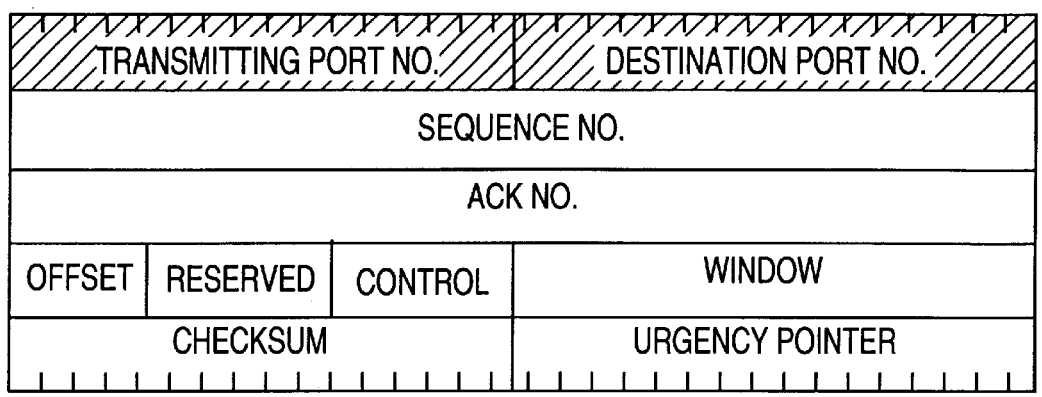
FIG. 8 is a drawing showing the TCP header host protocol format in TCP/IP.
Figure 9:
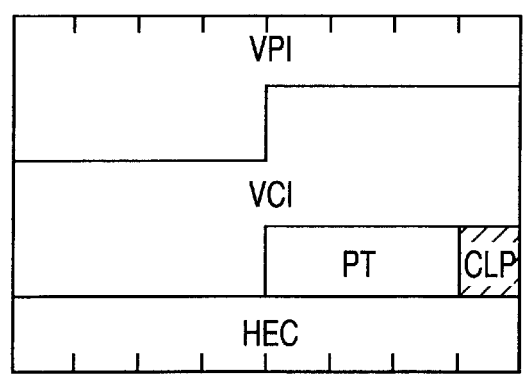
FIG. 9 is a drawing showing the ATM cell header format.

In the present embodiment, operations by the scheduler 20 can be executed by means of pipeline processing. FIG. 5 is a time chart showing how pipeline processing is carried out in individual time slots for allocation by the first allocator 22a, allocation by the second allocator 22b, and transfer data switching. Referring to FIG. 5, in the processing for the transfer data switched in time slot N, allocation is first performed for high-priority-level Class 1 requests by the first allocator 22a in time slot N−2. Next, this allocation result is passed on, and allocation is performed for low-priority-level Class 2 requests by the second allocator 22b in time slot N−1. Then transfer data switching is performed in time slot N, based on the results of allocation by the first allocator 22a and the second allocator 22b.

When this kind of pipeline processing is executed, the processing time required for allocation for connection requests of each priority level does not vary according to the number of priority levels. That is to say, even if multiple (3 or more) priority levels are set, as described later, only the degree of parallelism of the pipeline processing for each priority level increases, and the time required for allocation for connection requests of each priority level does not increase.

If allocation were not performed for each priority level as in the present embodiment, and switch scheduling were performed taking account of all priority levels as described in Prior Art, scheduling for connection requests of all priority levels would have to be completed in one time slot. However, as the number of priority levels increases, the number of bits of the tag value indicating the priority level also increases, making it difficult to perform the processing within one time slot. Therefore, a measure such as increasing the length of the time slots would be necessary.

In contrast, according to the present embodiment, the introduction of pipeline processing as described above enables switch scheduling to be carried out without changing the time slot length even if the number of priority levels increases.

Next, Embodiment 2 of the present invention is described. The switch configuration of this embodiment is similar to that of Embodiment 1 shown in FIG. 1. That is, it comprises a plurality of input ports 10a to 10b that input data, a plurality of output ports 40a to 40b that output data, a switching execution block 30 that switches data input from the input ports 10a to 10b and transmits it to the output ports 40a to 40b, and a scheduler 50 that controls switching by the switching execution block 30. The input ports 10a to 10b each comprise queues 11 provided for each output port.

Figure 10:
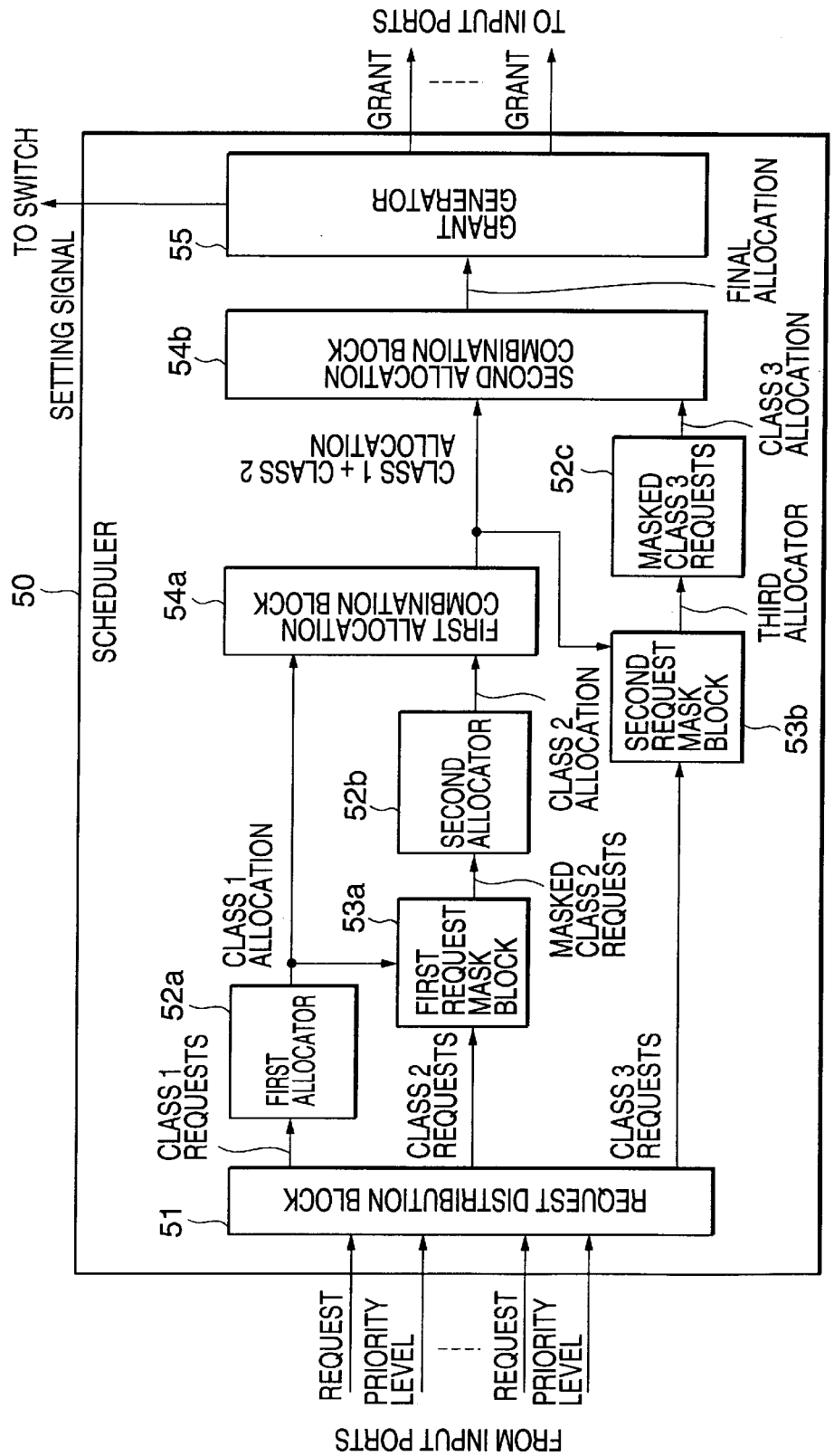
FIG. 10 is a block diagram showing the configuration of the scheduler in Embodiment 2 of the present invention.

FIG. 10 is a block diagram showing the configuration of the scheduler 50 in the switch of the present embodiment. With reference now to FIG. 10, the scheduler 50 comprises a request distribution block 51 that performs 3-way distribution of transfer data according to priority level, a first allocator 52a that performs allocation of the highest-priority-level transfer data, a first request mask block 53a that masks connection requests for the second-highest-priority-level transfer data on the basis of the result of allocation by the first allocator 52a, a second allocator 52b that performs allocation of second-highest-priority-level transfer data after processing by the first request mask block 53a, a first allocation combination block 54a that combines the results of allocation by the first allocator 52a and the second allocator 52b, a second request mask block 53b that masks connection requests for the lowest-priority-level transfer data on the basis of the combined allocation result produced by the first allocation combination block 54a, a third allocator 52c that performs allocation of lowest-priority-level transfer data after processing by the second request mask block 53b, a second allocation combination block 54b that combines the combined allocation result produced by the first allocation combination block 54a and the result of allocation by the third allocator 52c, and a grant generator 55 that generates Grant signals indicating the scheduling result according to the final combined allocation result produced by the second allocation combination block 54b. FIG. 10 shows only the configuration characteristic of the present embodiment, and omits other general configuration items.

In the scheduler 50 configured as described above, the request distribution block 51 performs 3-way distribution of connection requests by data priority level on the basis of priority level notifications received from input ports 10a to 10b accompanying connection requests requesting connection to the switch 30. In the present embodiment there are three priority levels, with the highest-priority-level connection requests designated as Class 1 requests, the second-highest-priority-level connection requests designated as Class 2 requests, and the lowest-priority-level connection requests designated as Class 3 requests. Class 1 requests are sent to the first allocator 52a, Class 2 requests to the second allocator 52b, and Class 3 requests to the third allocator 52c.

The respective functions of the first, second, and third allocators 52a, 52b, and 52c, of the first and second request mask blocks 53a and 53b, and of the first and second allocation combination blocks 54a and 54b, are similar to the functions of the first and second allocators 22a and 22b, the request mask block 23, and the allocation combination block 24 in the scheduler 20 of Embodiment 1 shown in FIG. 2. That is, the present embodiment is equivalent to a configuration provided with components comprising the second request mask block 53b, the third allocator 52c, and the second allocation combination block 54b, in addition to the configuration of the scheduler 20 in Embodiment 1. By performing masking of lower-priority-level external requests with a lower priority level using the combined allocation result produced by the first allocation combination block 54a, and performing allocation for these connection requests, appropriate allocation is implemented for connection requests distributed according to 3 priority levels.

The grant generator 55 is similar to the grant generator 25 in the scheduler 20 of Embodiment 1 shown in FIG. 2, and, based on the final allocation generated by the second allocation combination block 54b, outputs a setting signal that sets the switch 30, and transmits Grant signals to input ports 10a to 10b to give notification of switch connection permission.

Figure 11:
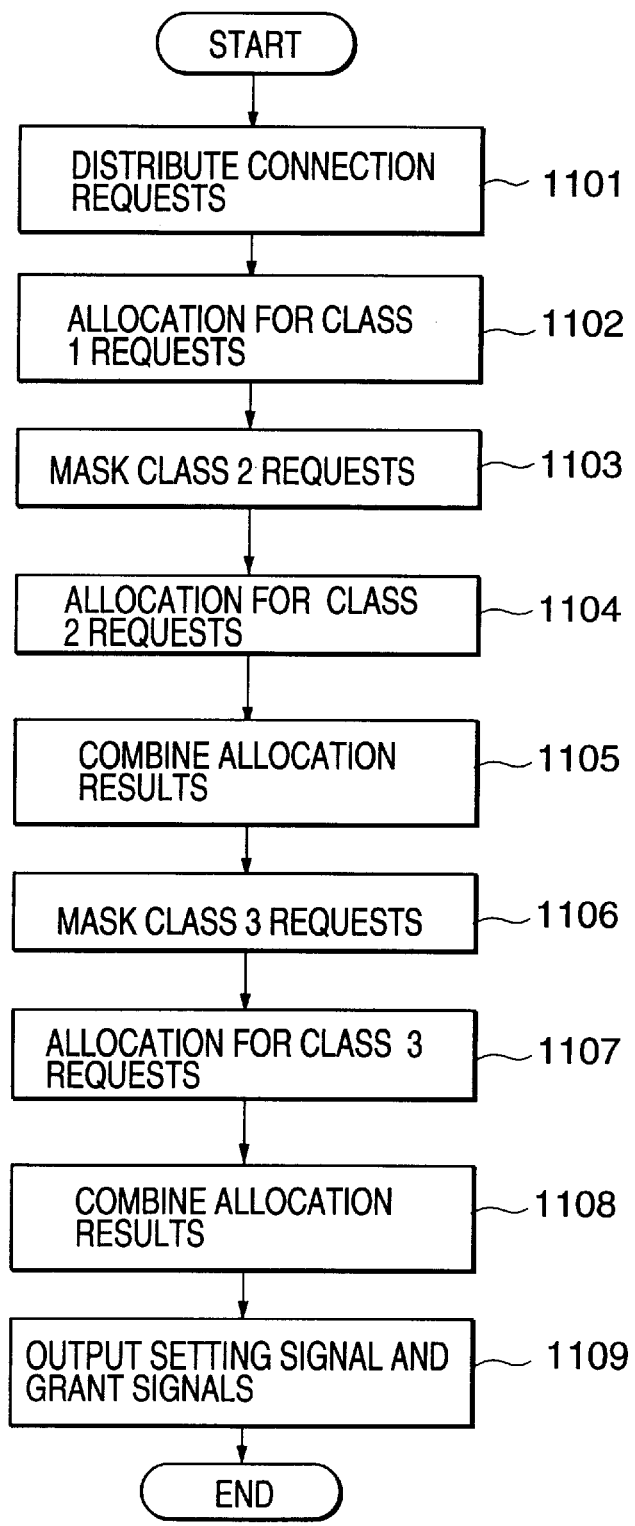
FIG. 11 is a flowchart showing the operation of the scheduler in Embodiment 2.

Next, the operation of the scheduler 50 in the present embodiment is described with reference to the flowchart in FIG. 11. First, connection requests input to the scheduler 50 are distributed as Class 1 requests, Class 2 requests, and Class 3 requests by the request distribution block 51 (step 1101). Next, allocation is performed for the Class 1 requests by the first allocator 52a (step 1102).

Next, Class 2 requests are masked by the first request mask block 53a using the result of allocation by the first allocator 52a (step 1103). Then, allocation is performed for masked Class 2 requests by the second allocator 52b (step 1104). Next, the allocation result for Class 1 requests and the allocation result for Class 2 requests are combined by the first allocation combination block 54a (step 1105).

Next, Class 3 requests are masked by the second request mask block 53b using the combined allocation result produced by the first allocation combination block 54a (step 1106). Then, allocation is performed for masked Class 3 requests by the third allocator 52c (step 1107). Next, the combined allocation result produced by the first allocation combination block 54a and the allocation result for Class 3 requests are combined by the second allocation combination block 54b (step 1108).

Finally, a setting signal that sets the switch 30 and Grant signals that notify the input ports 10a to 10b of connection permission are output by the grant generator 55 in accordance with the combined allocation result produced by the second allocation combination block 54b (step 1109).

In the present embodiment, connection requests are distributed according to 3 priority levels, and allocation is performed according to each priority level, but by adding components comprising a request mask block and allocation combination block to the scheduler 50, it is possible for connection requests to be distributed according to multiple (4 or more) priority levels, and for allocation to be performed according to each priority level. If components comprising a request mask block and allocation combination block are added and connection requests are distributed according to multiple priority levels, the operations in steps 1106 to 1108 of the scheduling operation shown in FIG. 11 are repeated for each component.

Next, Embodiment 3 of the present invention is described. The switch configuration of this embodiment is similar to that of Embodiment 1 shown in FIG. 1. That is, it comprises a plurality of input ports 10a to 10b that input data, a plurality of output ports 40a to 40b that output data, a switching execution block 30 that switches data input from the input ports 10a to 10b and transmits it to the output ports 40a to 40b, and a scheduler 60 that controls switching by the switching execution block 30. [The input ports 10a to 10b each comprise queues 11 provided for each output port.]

Figure 12:
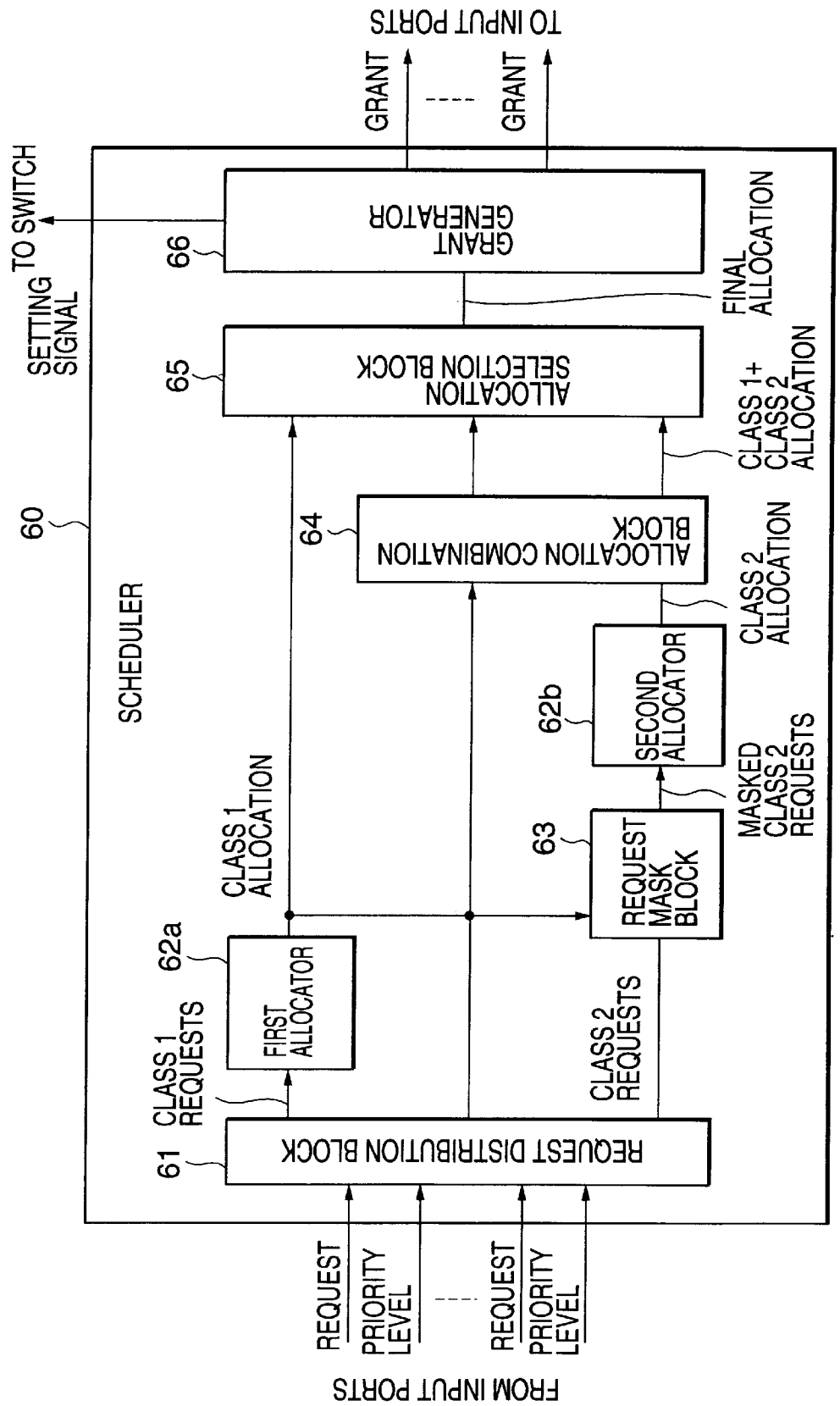
FIG. 12 is a block diagram showing the configuration of the scheduler in Embodiment 3 of the present invention.

FIG. 12 is a block diagram showing the configuration of the scheduler 60 in the switch of the present embodiment. With reference now to FIG. 12, the scheduler 60 comprises a request distribution block 61 that performs transfer data distribution according to priority level, a first allocator 62a that performs allocation of high-priority-level transfer data, a request mask block 63 that masks connection requests on the basis of the result of allocation by the first allocator 62a, a second allocator 62b that performs allocation of low-priority-level transfer data after processing by the request mask block 63, an allocation combination block 64 that combines the results of allocation by the first allocator 62a and the second allocator 62b, an allocation selection block 65 that selectively outputs either the result of allocation by the first allocator 62 or the combined allocation result produced by allocation combination block 64, and a grant generator 66 that generates Grant signals indicating the scheduling result according to the final allocation result output by the allocation selection block 65. FIG. 12 shows only the configuration characteristic of the present embodiment, and omits other general configuration items.

In the scheduler 60 configured as described above, the request distribution block 61, first allocator 62a, request mask block 63, second allocator 62b, and allocation combination block 64 are similar to the request distribution block 21, first allocator 22a, request mask block 23, second allocator 22b, and allocation combination block 24 in Embodiment 1 shown in FIG. 2.

The allocation selection block 65 inputs the result of allocation for Class 1 requests by the first allocator 62a and the result of allocation for Class 1 requests and Class 2 requests combined by the allocation combination block 64, and selectively outputs one or the other.

The grant generator 66 is similar to the grant generator 25 in the scheduler 20 of Embodiment 1 shown in FIG. 2, and, based on the final allocation output by the allocation selection block 65, outputs a setting signal that sets the switch 30, and transmits Grant signals to input ports 10a to 10b to give notification of switch connection permission.

When switch scheduling is performed taking account of data priority levels, the time required for switch scheduling for all connection requests increases. Therefore, if there is a requirement for switch scheduling to be performed faster that in the case of switch scheduling that reflects data priority levels, it is preferable for allocation of switch connections to be carried out in response to connection requests without taking priority levels into consideration. Thus, the allocation selection block 65 is provided in the switch 60, enabling the result of allocation by the first allocator 62a to be output directly as necessary, and if switch scheduling according to priority level is not necessary, allocation is performed under the same conditions by the first allocator 62a, and switch 30 setting and notification of the input ports 10a to 10b are performed on the basis of this allocation result.

In order for the allocation selection block 65 to decide which result to select and output—the allocation result from the first allocator 62a, or the combined allocation result from the allocation combination block 64—information as to whether allocation was performed by the first allocator 62a, or by the first allocator 62a and the second allocator 62b, must be held by the allocation selection block 65 for all connection requests. In taking the fact of whether allocation is performed by the first allocator 62a alone, or by both the first allocator 62a and the second allocator 62b, as the switching criterion, it is possible, for example, for the transfer data traffic volume to be monitored, and when the traffic volume is not enough to cause switch congestion, for allocation to be performed by the first allocator 62a alone, without adding a priority level. When this kind of criterion is provided, it is necessary to provide the input ports 10a to 10b with a traffic monitoring block, and notify the request distribution block 61 and allocation selection block 65 of the traffic volume detected by this traffic monitoring block, in order to perform switching. However, as a traffic monitoring means in the input ports 10a to 10b is also necessary for other general processing in this kind of switch, it has traditionally been provided, and so it is possible to use the information relating to traffic volume obtained by this monitoring means.

Also, in taking the fact of whether allocation is performed by the first allocator 62a alone, or by both the first allocator 62a and the second allocator 62b, as another criterion for switching, if the request distribution block 61 determines that the same priority level is attached to all connection requests, it is possible for the request distribution block 61 to report this determination result to the allocation selection block 65, and for switching to be performed so that the result of allocation by the first allocator 62a is selected.

Figure 13:
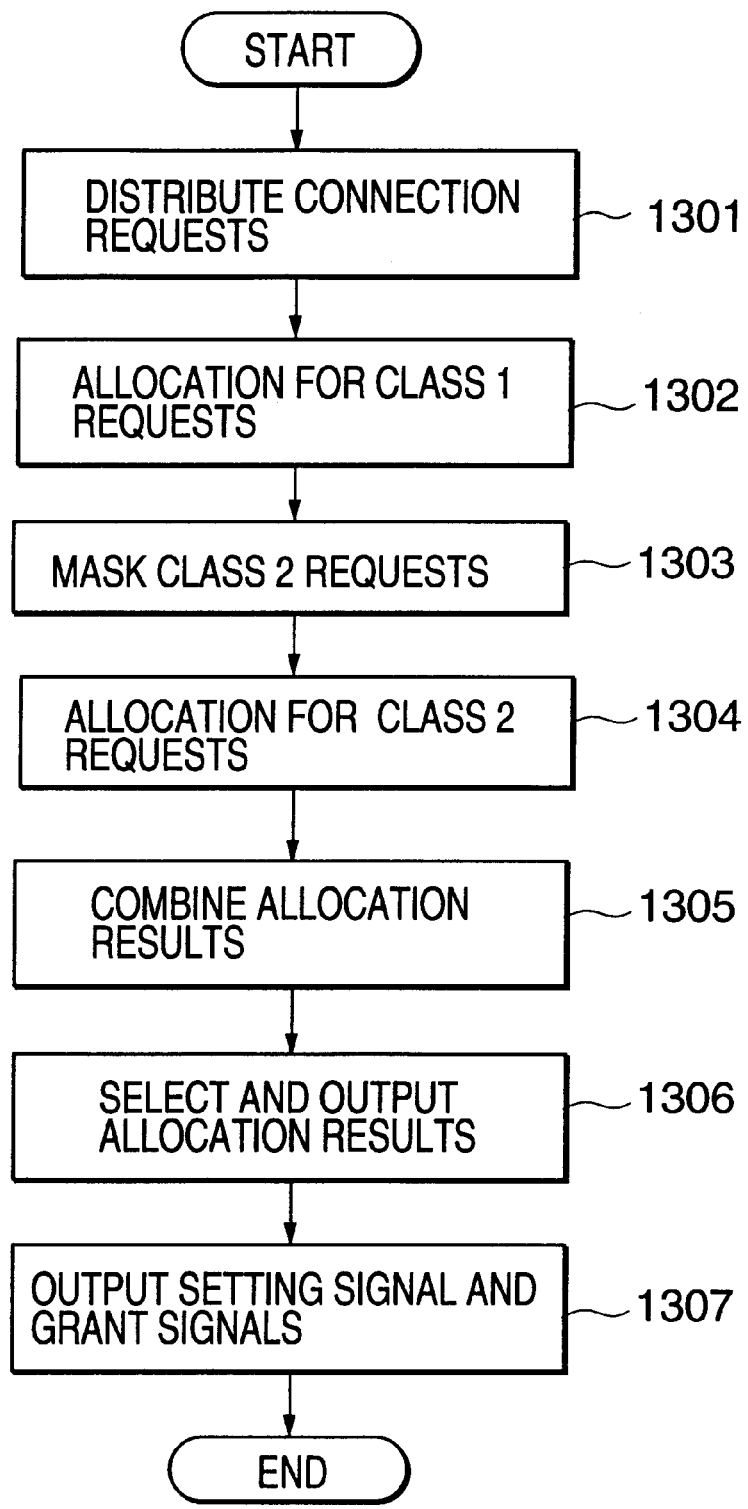
FIG. 13 is a flowchart showing the operation of the scheduler in Embodiment 3.
Figure 14:
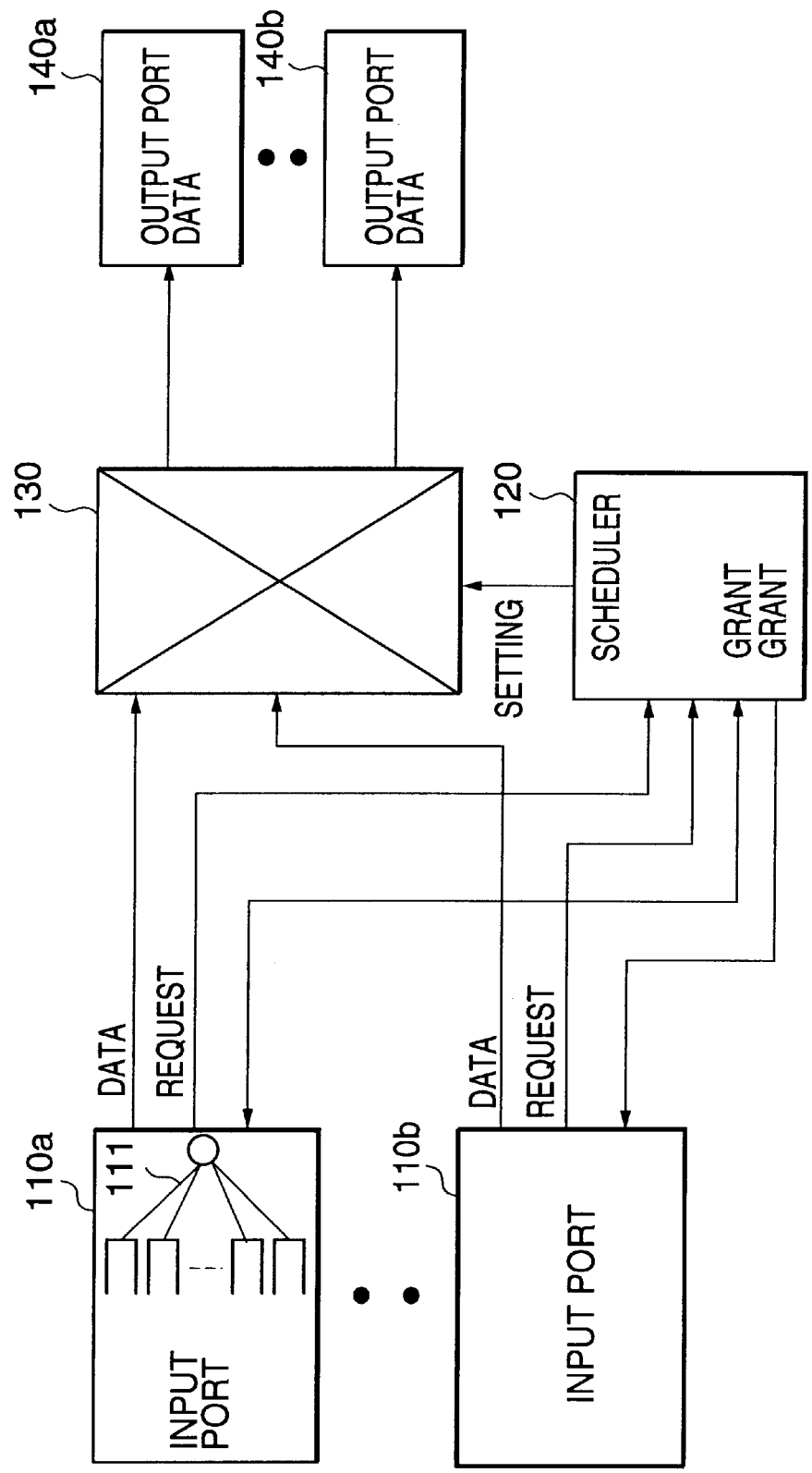
FIG. 14 is a block diagram showing the configuration of a conventional switch.
Figure 15:
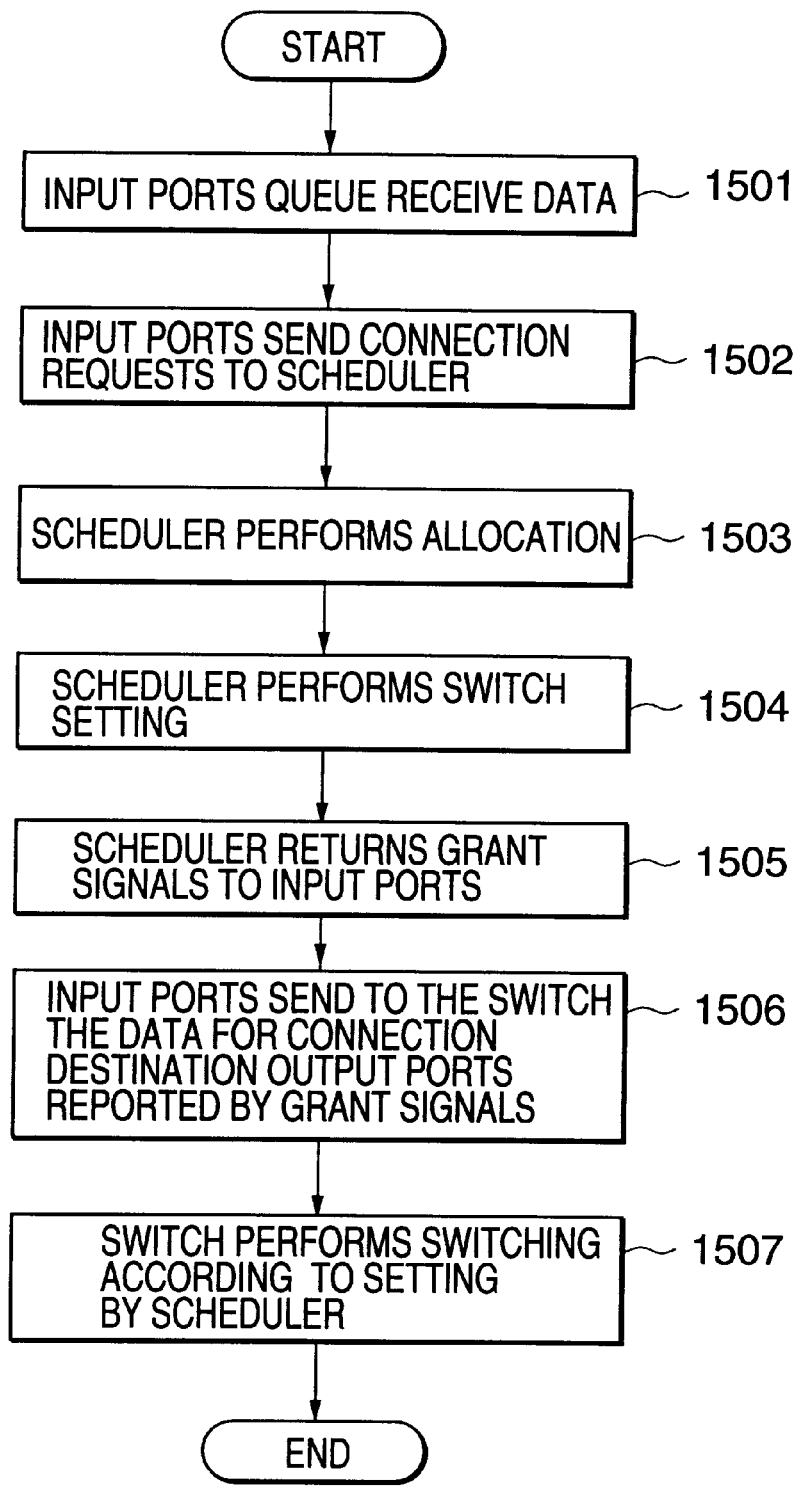
FIG. 15 is a flowchart showing the operation of a conventional switch.
Figure 16:
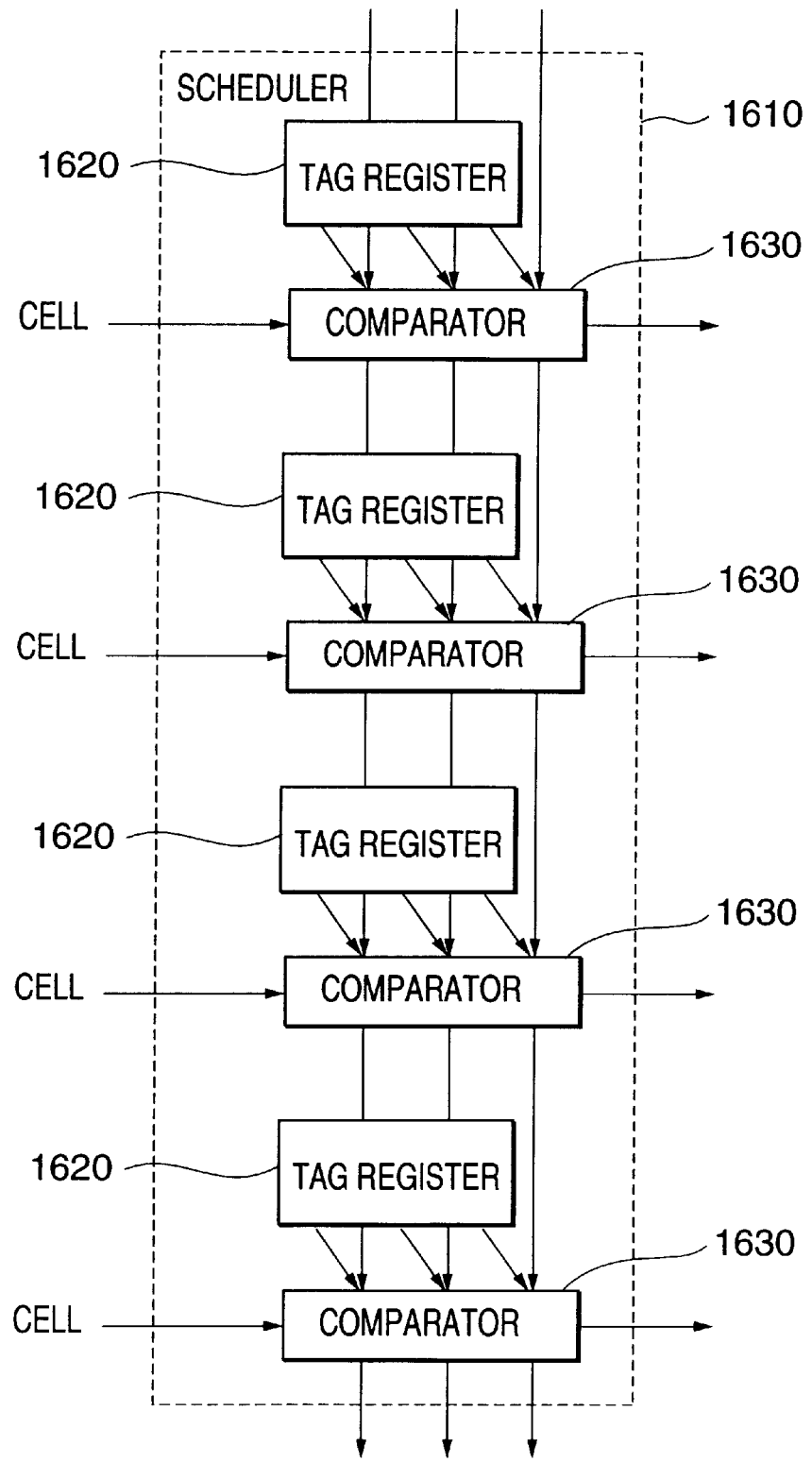
FIG. 16 is a block diagram showing the configuration of another conventional switch.

Next, the operation of the scheduler 60 in the present embodiment is described with reference to the flowchart in FIG. 13. First, connection requests input to the scheduler 60 are distributed as Class 1 requests and Class 2 requests by the request distribution block 61 (step 1301). Next, allocation is performed for the Class 1 requests by the first allocator 62a (step 1302).

Next, Class 2 requests are masked by the request mask block 63 using the result of allocation by the first allocator 62a (step 1303). Then, allocation is performed for masked Class 2 requests by the second allocator 62b (step 1304). Next, the allocation result for Class 1 requests and the allocation result for Class 2 requests are combined by the allocation combination block 64 (step 1305).

Next, either the result of allocation by the first allocator 62a, or the combined allocation result produced by the allocation combination block 64, is selected and output by the allocation selection block 65 (step 1306).

Finally, a setting signal that sets the switch 30 and Grant signals that notify the input ports 10a to 10b of connection permission are output by the grant generator 66 in accordance with the allocation result selected by the allocation selection block 65 (step 1307).

In this way, in the present embodiment switch scheduling can be carried out using, as desired, the allocation results for Class 1 requests and Class 2 requests in which priority levels are considered, and the allocation results for Class 1 requests alone, in which priority levels are not considered.

The present invention has been described above in terms of the preferred embodiments, but the present invention is not necessarily limited to the aforementioned embodiments. For example, it is possible to create a configuration that allows the number of priority level settings to be controlled arbitrarily by combining the configuration in Embodiment 2, which combines components comprising allocators, request mask blocks, and allocation combination blocks, with the configuration in Embodiment 3, which enables arbitrary switching of whether or not priority levels are to be reflected in the switch scheduling.

As explained above, according to the switch, and associated scheduler and switch scheduling method, of the present invention, connection requests are distributed according to priority level, allocation is performed first for high-priority-level connection requests, low-priority-level connection requests are masked using this allocation result, then allocation is performed for the masked low-priority-level connection requests, making it possible to implement flexible switch scheduling that reflects priority levels set in the data, by means of a simple apparatus configuration; and moreover, an ordinary allocation algorithm as used in conventional switches can be used for the actual allocation algorithm that performs allocation of switch connections in response to connection requests, enabling easy introduction into a network system.

What is claimed is:

1. A switch that is provided in a network and performs data transfer, and that includes a plurality of input ports that input transfer data, a plurality of output ports that output transfer data, a switch execution block that executes switching transfer data from said input ports to said output ports, and a scheduler that controls switching by said switch execution block in response to connection requests of said transfer data from said input ports, wherein, said scheduler comprises:
a distribution block that inputs each connection request together with a priority level of said transfer data from said input ports and classifies said each connection request in accordance with said priority level;
a first allocator that performs allocation of switching connection in the switch execution block by selecting one of the connection requests, from among the classified connection requests, having a high priority level and both input port and output port available for use;
a request mask block that inputs connection requests having a low priority level classified by the distribution block and the result of allocation of the switching connection performed by the first allocator, and masks the connection requests having the low priority level and both of input port and output port to be used coincide with the result of allocation by the first allocator;
a second allocator that performs allocation of switching connections for connection requests having the low priority level with reference to the masked connection requests;
an allocation combination block that combines the results of allocation of switching connections by the first and second allocators; and
a grant generator that sets the switch execution block on the basis of the combined allocation result, and outputs Grant signals to respective input port for allowing switching connection of transfer data corresponding to the connection request.

2. The switch according to claim 1, further comprising an allocation selection block, provided between said allocation combination block and said grant generator, whereby the result of switching connection allocation by said first allocator and the result of switch connection allocation combined by said allocation combination block are input, and one or other of said switch connection allocation results is output selectively and sent to said grant generator,
wherein said grant generator sets the switch execution block on the basis of the result of switch connection allocation output from said allocation selection block, and outputs Grant signals to respective input port for allowing switching connection of transfer data corresponding to the connection request.

3. A switch that is provided in a network and performs data transfer, and that includes a plurality of input ports that input transfer data, a plurality of output ports that output transfer data, a switch execution block that executes switching transfer data from said input ports to said output ports, and a scheduler that controls switching by said switch execution block in response to connection requests of said transfer data from said input ports, wherein, said scheduler comprises:
a distribution block that inputs each connection request together with a priority level of said transfer data from said input ports and classifies said connection request in accordance with said priority level;
a first allocator that performs allocation of switching connection in the switch execution block by selecting one of the connection requests, from among the classified connection requests, having a first priority level and both input and output ports available for use;
a first request mask block that inputs classified connection requests having a second priority level classified by the distribution block and the result of allocation of switching connection performed by the first allocator, and masks connection requests having the second priority level and both input and output ports to be used coincide with the result of allocation by the first allocator;
a second allocator that performs allocation of switching connections for connection requests having the second priority level with referring to the masked connection requests by the first request mask block;
a first allocation combination block that combines the results of allocation of switching connections by the first and second allocators;
a second request mask block that inputs classified connection requests having a third priority level classified by the distribution block and the result of allocation of switching connection performed by the first allocation combination block, and masks connection requests having the third priority level and both of input and output ports to be used coincide with the result of allocation by the first allocation combination block;
a third allocator that performs allocation of switching connections for connection requests having the third priority level while referring to the masked connection requests by the second request mask block;
a second allocation combination block that combines the results of allocation of switching connections by the first allocation combination block and the third allocator; and
a grant generator that sets the switch execution block on the basis of the combined allocation result by said second allocation combination block, and outputs Grant signals to respective input port for allowing switching connection of transfer data corresponding to the connection request.

4. The switch according to claim 3, wherein said scheduler executing connection allocation corresponding to data transfer connection requests by pipeline processing for each priority level.

5. A scheduler in a switch, that is configured by including a plurality of input ports that input transfer data, a plurality of output ports that output transfer data, a switch execution block that executes switches transfer data from said input ports to said output ports, said scheduler for controlling switching operation by said switch execution block in response to connection requests of said transfer data from said input ports, wherein, said scheduler comprises:
a distribution block that inputs each connection request together with a priority level of said transfer data from said input ports and classifies said each connection request in accordance with said priority level;

a first allocator that performs allocation of switching connection in the switch execution block by selecting one of the connection requests, from among the classified connection requests having a high priority level and both input and output ports available for use;

a request mask block that inputs connection requests having a low priority level classified by the distribution block and the result of allocation of switching connection performed by the first allocator, and masks connection requests having the low priority level and both of input port and output port to be used coincide with the result of allocation by the first allocator;

a second allocator that performs allocation of switching connections for connection requests having the low priority level with reference to the masked connection requests;

an allocation combination block that combines the results of allocation of switching connections by the first and second allocators; and a grant generator that sets the switch execution block on the basis of the combined allocation result, and outputs Grant signals to respective input port for allowing switching connection of transfer data corresponding to the connection request.

6. A switch scheduling method in a switch that is provided in a network and performs data transfer, and that includes a plurality of input ports that input transfer data, a plurality of output ports that output transfer data, a switch execution block that executes switching transfer data from said input ports to said output ports, and a scheduler that controls switching by said switch execution block in response to connection requests of said transfer data from said input ports, said method comprising:

classifying each connection request of said transfer data from said input ports in accordance with a priority level set in said transfer data;

allocating a switching connection in the switch execution block by selecting one of connection requests from among the classified connection requests of said transfer data, which has a high priority level and both input output ports available for use;

masking connection requests of said transfer data, which are classified as a low priority level and as having both of the input output ports to be used already engaged by said allocating result of the high priority level connection request;

allocating switching connections in the switch execution block by selecting connection requests having the low priority level with reference to the masking result;

combining allocation results of switching connections for connection requests having the high priority level and the low priority level;

setting the switch execution block on the basis of the combined allocation results; and outputting Grant signals to respective input port for allowing switching connection of transfer data corresponding to the connection request.

7. The switch scheduling method according to claim 6, further comprising a selection step, provided between said combination step and said permitting switch connection step, of inputting the results of switch connection allocation by the switch connection allocation step corresponding to said connection request for said transfer data with a high priority level, and the result of switch connection allocation combined in said combination step, and outputting selectively either of said switch connection allocation results, wherein said means for executing switching is set, and notificaion is performed that permits switch connection for said input ports, on the basis of the result of switch connection allocation selected in said selection step, in said permitting switch connection step.

8. The switch scheduling method according to claim 6, wherein said switching connection allocation step corresponding to data transfer connection requests is executed in parallel by means of pipeline processing for each priority level.

9. A switch that is provided in a network and performs data transfer, and that includes a plurality of input ports that input transfer data, a plurality of output ports that output transfer data, a switch execution block that executes switching transfer data from said input ports to said output ports, and a scheduler that controls switching by said switch execution block in response to connection requests of said transfer data from said input ports, wherein, said scheduler comprises:

a distribution block that inputs each connection request together with priority level of said transfer data from said input ports and classifies said connection request into Nth priority levels, where N is a positive integer, in accordance with said priority level;

a first allocator that performs allocation of switching connection in the switch execution block by selecting one of connection requests, from among classified connection requests, having a first priority level and both of input port and output port are available to be used for;

a first request mask block that inputs classified connection requests having the second priority level classified by the distribution block and the result of allocation of switching connection performed by the first allocator, and masks connection requests having the second priority level and both of input port and output port to be used coincide with the result of allocation by the first allocator;

a second allocator that performs allocation of switching connections for connection requests having the second priority level with referring to the masked connection requests by the first request mask block;

a first allocation combination block that combines the results of allocation of switching connections by the first and second allocators;

an (N+1)th request mask-block that inputs classified connection requests having an (N+2)th priority level classified by the distribution block and the result of allocation of switching connection performed by an Nth allocation combination block, and masks connection requests having the (N+2)th priority level and both of input port and output port to be used coincide with the result of allocation by an Nth allocation combination block;

an (N+2)th allocator that performs allocation of switching connections for connection requests having the (N+2) priority level with referring to the masked connection requests by the (N+1) request mask block;

an (N+1) allocation combination block that combines the results of allocation of switching connections by the Nth allocation combination block and the (N+2) th allocator; and a grant generator that sets the switch execution block on the basis of the combined allocation result by said (N+2) th allocation combination block, and outputs Grant signals to respective input port for allowing switching connection of transfer data corresponding to the connection request.

10. A scheduler in a switch, that is configured by including a plurality of input ports that input transfer data, a plurality of output ports that output transfer data, a switch execution block that executes switching transfer data from said input ports to said output ports, said scheduler for controlling switching operation by said switch execution block in response to connection requests of said transfer data from said input ports, wherein, said scheduler comprises:
a distribution block that inputs each connection request together with priority level of said transfer data from said input ports and classifies said connection request in accordance with said priority level;
a first allocator that performs allocation of switching connection in the switch execution block by selecting one of connection requests, from among classified connection requests, having a first priority level and both of input port and output port are available to be used for;
a first request mask block that inputs classified connection requests having the second priority level classified by the distribution block and the result of allocation of switching connection performed by the first allocator, and masks connection requests having the second priority level and both of input port and output port to be used coincide with the result of allocation by the first allocator;
a second allocator that performs allocation of switching connections for connection requests having the second priority level with referring to the masked connection requests by the first request mask block;
a first allocation combination block that combines the results of allocation of switching connections by the first and second allocators;
a second request mask block that inputs classified connection requests having a third priority level classified by the distribution block and the result of allocation of switching connection performed by the first allocation combination block, and masks connection requests having the third priority level and both of input port and output port to be used coincide with the result of allocation by the first allocation combination block;
a third allocator that performs allocation of switching connections for connection requests having the third priority level with referring to the masked connection requests by the second request mask block;
a second allocation combination block that combines the results of allocation of switching connections by the first allocation combination block and the third allocator; and
a grant generator that sets the switch execution block on the basis of the combined allocation result by said second allocation combination block, and outputs Grant signals to respective input port for allowing switching connection of transfer data corresponding to the connection request.

11. A scheduler in a switch, that is configured by including a plurality of input ports that input transfer data, a plurality of output ports that output transfer data, a switch execution block that executes switching transfer data from said input ports to said output ports, said scheduler for controlling switching operation by said switch execution block in response to connection requests of said transfer data from said input ports, wherein, said scheduler comprises:
a distribution block that inputs each connection request together with priority level of said transfer data from said input ports and classifies said connection request into Nth priority levels, where N is a positive integer, in accordance with said priority level;
a first allocator that performs allocation of switching connection in the switch execution block by selecting one of connection requests, from among classified connection requests, having a first priority level and both of input port and output port are available to be used for;
a first request mask block that inputs classified connection requests having the second priority level classified by the distribution block and the result of allocation of switching connection performed by the first allocator, and masks connection requests having the second priority level and both of input port and output port to be used coincide with the result of allocation by the first allocator;
a second allocator that performs allocation of switching connections for connection requests having the second priority level with referring to the masked connection requests by the first request mask block;
a first allocation combination block that combines the results of allocation of switching connections by the first and second allocators;
an (N+1)th request mask block that inputs classified connection requests having an (N+2)th priority level classified by the distribution block and the result of allocation of switching connection performed by an Nth allocation combination block, and masks connection requests havin the (N+2)th priority level and both of input port and output port to be used coincide with the result of allocation by an Nth allocation combination block;
an (N+2)th allocator that performs allocation of switching connections for connection requests having the (N+2) priority level with referring to the masked connection requests by the (N+1) request mask block;
an (N+1) allocation combination block that combines the results of allocation of switching connections by the Nth allocation combination block and the (N+2) th allocator; and
a grant generator that sets the switch execution block on the basis of the combined allocation results by said (N+2)th allocation combination block, and outputs Grant signals to respective input port for allowing switching connection of transfer data corresponding to the connection request.

12. A switch scheduling method in a switch that is provided in a network and performs data transfer, and that includes a plurality of input ports that input transfer data, a plurality of output ports that output transfer data, a switch execution block that executes switching transfer data from said input ports to said output ports, and a scheduler that controls switching by said switch execution block in response to connection requests of said transfer data from said input ports, said method comprising:

classifying each connection request of said transfer data from said input ports in accordance with a priority level set in said transfer data;
allocating a switching connection in the switch execution block by selecting one of connection requests from among the classified connection requests of said transfer data, which has a first priority level and both of input port and output port are available to be used for;

masking connection requests of said transfer data, which has a second priority level being classified and both of input port and output port to be used have already been engaged by said allocating result of the first priority level connection request;

allocating switching connections in the switch execution block by selecting connection requests having the second priority level with referring to the masking result;

combining allocation results of switching connections for connection requests having the first priority level and the second priority level;

masking connection requests of said transfer data, which has a third priority level being classified and both of input port and output port to be used have already been engaged by said allocating result of the first priority level connection request and the second priority level connection requests;

allocating switching connections in the switch execution block by selecting connection requests having the third priority level with referring to the masking result for the third priority level connection requests;

combining allocation results of switching connections for connection requests having the first priority level, the second priority level and the third priority level;

setting the switch execution block on the basis of the combined allocation results; and outputting Grant signals to respective input port for allowing switching connection of transfer data corresponding to the connection request.

* * * * *